UNITED STATES PATENT OFFICE.

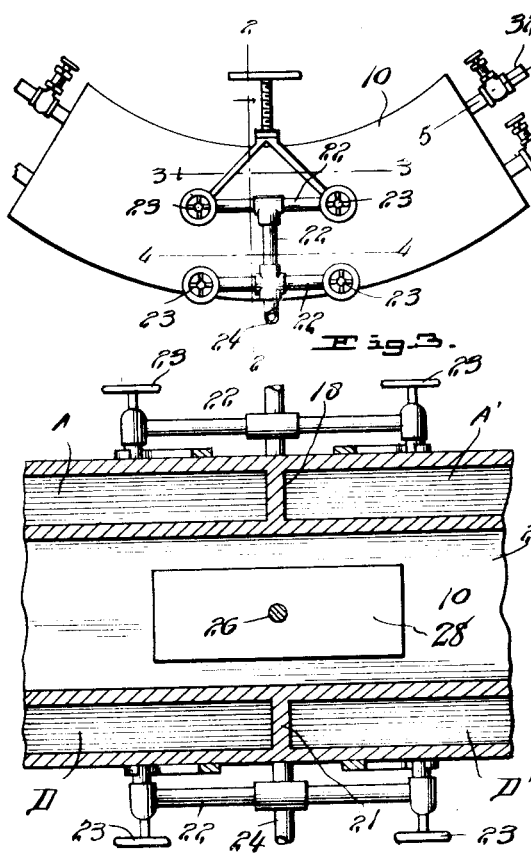

ORLA A. HAYNER AND HARRY L. HAYNER, OF MASON, MICHIGAN.

VULCANIZER.

1,197,484.
Specification of Letters Patent.
Patented Sept. 5, 1916.

Application filed January 7, 1914. Serial No. 810,806.

*To all whom it may concern:*

Be it known that we, ORLA A. HAYNER and HARRY L. HAYNER, citizens of the United States, residing at Mason, in the county of Ingham, State of Michigan, have invented certain new and useful Improvements in Vulcanizers; and we do hereby declare the following to be a full, clear, and exact description of the invention, such as will enable others skilled in the art to which it appertains to make and use the same.

This invention relates to vulcanizers and more especially to that type used in repairing vehicle wheel tires or tire cases.

The object of the invention resides in the provision of a vulcanizer which will be simple, strong and efficient and in which desired portions of a tire may be placed and subjected to heat for the purpose of vulcanizing a patch on an injured portion of the tire.

A further object of the invention resides in the provision of a vulcanizer which embodies means for positively preventing the heat from spreading and affecting the portion of the tire surrounding the patch.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side elevation of a vulcanizer constructed in accordance with the invention; Fig. 2, a section on the line 2—2 of Fig. 1; Fig. 3, a section on the line 3—3 of Fig. 1; Fig. 4, a section on the line 4—4 of Fig. 1; Fig. 5, a section on the line 5—5 of Fig. 1, and Fig. 6, a perspective view of the clamp for forcing the tire into its seat in the vulcanizer.

Referring to the drawings the vulcanizer is shown as comprising a body 10 which is formed in the arc of a circle and provided with an interiorly disposed trough shape curing cavity 11 which is inclosed by a wall 12 and a surrounding or outer wall 13. The space between the walls 12 and 13 is divided by means of longitudinal partitions 14, 15 and 16 and by transverse partitions 18, 19, 20 and 21, all of said partitions being formed integral with the body and producing compartments A, B, C, D, A', B', C', and D'. Steam is adapted to be supplied to any of these compartments by means of branch pipes 22 provided with valves 23 and leading from a steam supply pipe 24 which latter is in turn connected with a suitable boiler (not shown).

The tire when seated in the cavity 11 is held in shape by bead members 25. The tire is held firmly in the vulcanizer during the repairing thereof by means of a clamping screw 26 mounted in a yoke 27 and working against a plate 28 seated upon the members 25. The ends of the yoke 27 terminate respectively in diverging arms 29 and 30 and the free ends of these arms terminate in hooks 31 which engage respectively with the branch pipes 22 delivering to the steam compartments A, D, A' and D'. By the engagement of the hook 31 the yoke 27 is suitably anchored to permit the proper operation of the clamping screw 26 as will be obvious. Mounted in the ends of the body 10 and communicating respectively with the various steam compartments are valved pipes 32 whereby water may be introduced into any of the desired steam compartments.

In the use of the vulcanizer steam is admitted into the compartment adjacent the patch and water introduced into the remaining compartments. During the process of vulcanization this water will absorb the heat which spreads into the walls of the body adjacent the heated compartment so that the temperature of the body adjacent the uninjured parts of the tire is maintained relatively low and in this manner injury to the parts of the tire surrounding the patch is entirely obviated.

We are aware that attempts have been previously made in devices of this character to prevent the spread of heat by the introduction of insulating strips into the wall of the body but such efforts have been unsuccessful owing to the fact that such insulating strips do not efficiently meet the requirements intended to be effected thereby.

What is claimed is:

1. A vulcanizer comprising a hollow body having an exterior curing cavity therein to receive a tire casing to be vulcanized, longitudinal and transverse partitions dividing said body into steam chambers extending around said curing cavity, vertical steam supply pipes on opposite sides of the body, branch pipes extending laterally from said supply pipes in either direction, lateral extensions on said branch pipe extending into respective compartments, a U-shaped clamping member having the terminals of its arm forked and each fork provided with a hook portion engageable respectively with the lateral extensions of the branch pipes, and a screw threaded in the arm connecting portion of the U-shaped member for forcing the tire into the cavity.

2. In a vulcanizer, the combination with a body having a plurality of chambers therein and a pipe communicating with each of said chambers; of a substantially U-shaped clamping member adapted to be inverted to span said body, the terminals of each of the arms of said member being forked, a hook at the extremity of each of said forked members to engage around said pipes, and a screw threaded in the bight portion of said clamping member, substantially as described.

In testimony whereof, we affix our signatures, in the presence of two witnesses.

ORLA A. HAYNER.
HARRY L. HAYNER.

Witnesses:
 G. L. PECK,
 N. N. RAVSE.